United States Patent [19]

Buhler

[11] 3,812,875

[45] May 28, 1974

[54] VALVE FOR PROPORTIONING FLUID FLOW

[75] Inventor: Andreas Buhler, Krugersdorp, South Africa

[73] Assignee: Castle Brass Works (Proprietary) Limited, Transvaal Province, South Africa

[22] Filed: Feb. 25, 1972

[21] Appl. No.: 229,441

[30] Foreign Application Priority Data
Mar. 12, 1971  South Africa...................... 71/1640

[52] U.S. Cl............ 137/454.6, 137/635, 137/636.1, 137/637.2
[51] Int. Cl............................................ F16k 11/14
[58] Field of Search ........ 137/607, 635, 636, 636.1, 137/637.2, 454.6

[56] References Cited
UNITED STATES PATENTS

| | | | |
|---|---|---|---|
| 2,898,938 | 8/1959 | Dombre | 137/635 |
| 2,980,141 | 4/1961 | Brinkman | 137/607 X |
| 3,173,444 | 3/1965 | Bucknell et al. | 137/454.6 |
| 3,349,802 | 4/1967 | Christiansen | 137/607 X |
| 3,421,540 | 1/1969 | Fulton et al. | 137/454.6 |

FOREIGN PATENTS OR APPLICATIONS
927,682  6/1963  Great Britain...................... 137/607

Primary Examiner—Alan Cohan
Assistant Examiner—Richard Gerard
Attorney, Agent, or Firm—Ladas, Parry, Von Gehr, Goldsmith & Deschamps

[57] ABSTRACT

The proportioning of the flow of a plurality of fluids, by differentially adjusting the maximum degree of opening relative to their seats of a plurality of valve closure members controlling the flow of such fluids, the said differential adjustment taking place via a cam-like surface co-operating cam-follower fashion with the closure members. More specifically a hot water and cold water mixer valve for domestic water installations for use in sinks, baths, or showers, to proportion the flows of hot and cold water through a single outlet and to maintain such flows when adjusted.

3 Claims, 4 Drawing Figures

VALVE FOR PROPORTIONING FLUID FLOW

THIS INVENTION relates to a fluid flow control valve for proportioning fluid flow. It relates in particular to a mixer valve suitable for mixing fluids in desired proportions. It relates more particularly to a mixer valve for mixing hot and cold water in domestic water reticulation installations.

According to the invention, a method of proportioning the flow of fluids, includes differentially adjusting the maximum degree of opening of a plurality of valve closure members relative to their seats by displacing a cam-like surface cooperating cam-follower fashion with the closure members The cam-like surface may be provided on an adjustment member. The displaceability of the cam-like surface may be arcuate about an adjustment axis.

The invention extends also to a valve mechanism which includes a plurality of valve closure members axially displaceable in operation relative to their seats, and an adjustment member having a cam-like adjustment surface for co-operating cam-follower fashion with the valve closure members, the adjustment member being displaceable relative to an adjustment axis offset from the axes of the closure members, thereby providing adjustability in the degree of axial displacement of the closure members relative to their seats.

The adjustment axis may be parallel to the axes of the closure members. The adjustment member may also be axially displaceable along the adjustment axis relative to the closure members The adjustment member may include a tilt member and a spindle which is co-axial with the adjustment axis and which provides the axial displaceability of the adjustment member along the adjustment axis; the tilt member being pivotally mounted ball and socket fashion on the spindle so as to be tiltable relative to the spindle about an axis disposed transversely to the adjustment axis and having the cam-like adjustment surface which thereby is also tiltable.

The adjustment member may have a handle or knob co-axial with the spindle which also has a handle or knob.

The valve mechanism may include a fulcrum support offset from the adjustment axis, and adapted to but against the tilt member when the spindle is axially displaced along the adjustment axis, thereby providing tilting of the tilt member and hence of the adjustment surface relative to the spindle.

The invention extends also to a valve assembly as described, and a valve body having an outlet opening and a plurality of inlet passages communicating with the outlet opening, the valve assembly including a plurality of closure members and seats offset from the adjustment axis; and there being as many inlet passages as there are valve closure members and seats in the valve mechanism, each valve seat being operatively mounted in an inlet passage to control fluid flow therethrough to the outlet opening.

The valve seat or seats may be provided in a valve seat member which is removable from the valve body, and which is adapted to seat sealingly in the valve body.

According to another aspect of the invention, there is provided a mixer valve having two co-axial knobs or handles rotatable relative to each other about their common axis, and providing stepless adjustment in the proportioning of the rate of flow of fluids through the valve via two inlet passages to an outlet opening.

The invention will now be described by way of example, with reference to the accompanying drawings in which are shown particularly two embodiments of a mixer valve for a domestic hot and cold water installation.

Figure 1:
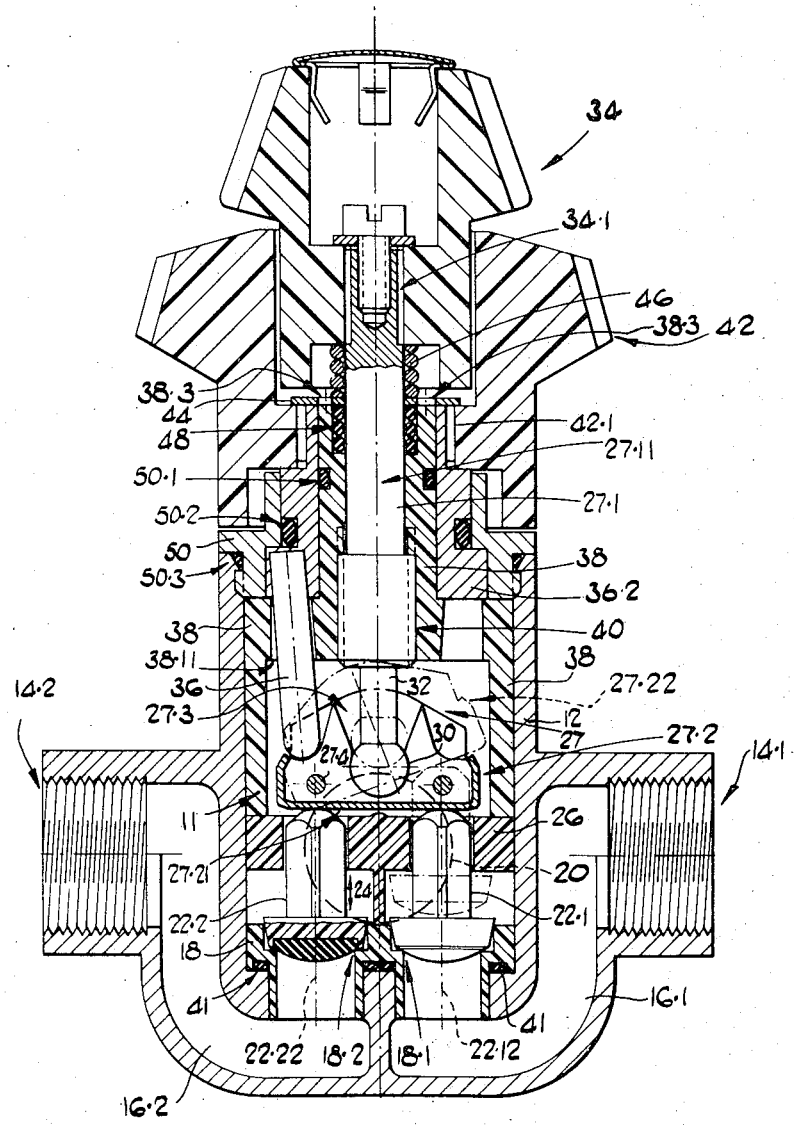
FIG. 1 shows an axial section of one embodiment of a mixer valve for two fluids, in accordance with the invention.

Referring to the drawings, reference numeral 10 refers generally to a valve assembly in accordance with the invention. It comprises a valve mechanism 11 and a valve body 12 having an inlet opening 14.1 connected via an inlet passage 16.1 and via a valve seat 18.1 with an outlet opening 20. The valve body 12 has a further inlet opening 14.2 connected via a further inlet passage 16.2 and via a valve seat 18.2 with the outlet opening 20.

The valve mechanism 11 comprises the valve seat member 18 and a pair of valve closure members 22.1 and 22.2 whose stems are guided for linear movement in the direction of arrow 24 by guide member 26 which also forms part of the valve mechanism. The valve closure members 22.1 and 22.2 are displaceable off their seats 18.1 and 18.2 respectively, by means of fluid pressure on the inlet side of the valve body 12. The closure members 22.1 and 22.2 are displaceable relative to their seats along their axes 22.12 and 22.22.

The degree of displacement of the valve closure members is adjustable by the position and attitude of an adjustment member also forming part of the valve mechanism and generally indicated by reference numeral 27. It comprises a spindle 27.1 and a tilt member 27.2 engaging ball and socket fashion with the ball 30 of the spindle 27.1 which is rotatable about its polar axis 27.11 by means of a knob 34. The tilt member 27.2 is supported by a fulcrum pin 36 eccentrically to the axis 27.11 which is co-axial with the adjustment axis of the adjustment member. The tilt member further has a cam-like surface 27.21 which is plane and which is adapted to bear cam-fashion against the ends of the stems of the closure members 22.1 and 22.2. Adjustability of the slope of the surface 27.21 relative to the adjustment axis 27.11 is obtainable by adjusting the axial position of the spindle 27.1 relative to the end of the fulcrum pin 36. This axial adjustment is obtained by screwing the spindle 27.1 relative to the member 38 by means of the screw thread 40. Thus, in FIG. 1, the tilt member 27.2 is shown in full lines in a position corresponding to the fully closed position of the valve. It is so positioned about the axis 27.11 that it bears fully on the ends of the stems of the closure members 22.1 and 22.2 to urge them closeably onto their seats 18.1 and 18.2. In the dotted position 27.22 (see FIG. 1) the closure member 22.1 will be capable of full displacement off its seat to its open position, whereas the other closure member 22.2 will still be fully seated in its closed position.

The axes of the closure members 22.1 and 22.2 are so arranged that they lie more or less in the same plane as the axis 27.11 and parallel thereto. Differential adjustment of the degree of displaceability of the closure members 22.1 and 22.2 is obtainable by varying the slope of the surface 27.21 relative to the axis 27.11, and by arcuately displacing the said surface 27.21 about the axis 27.11.

Figure 2:
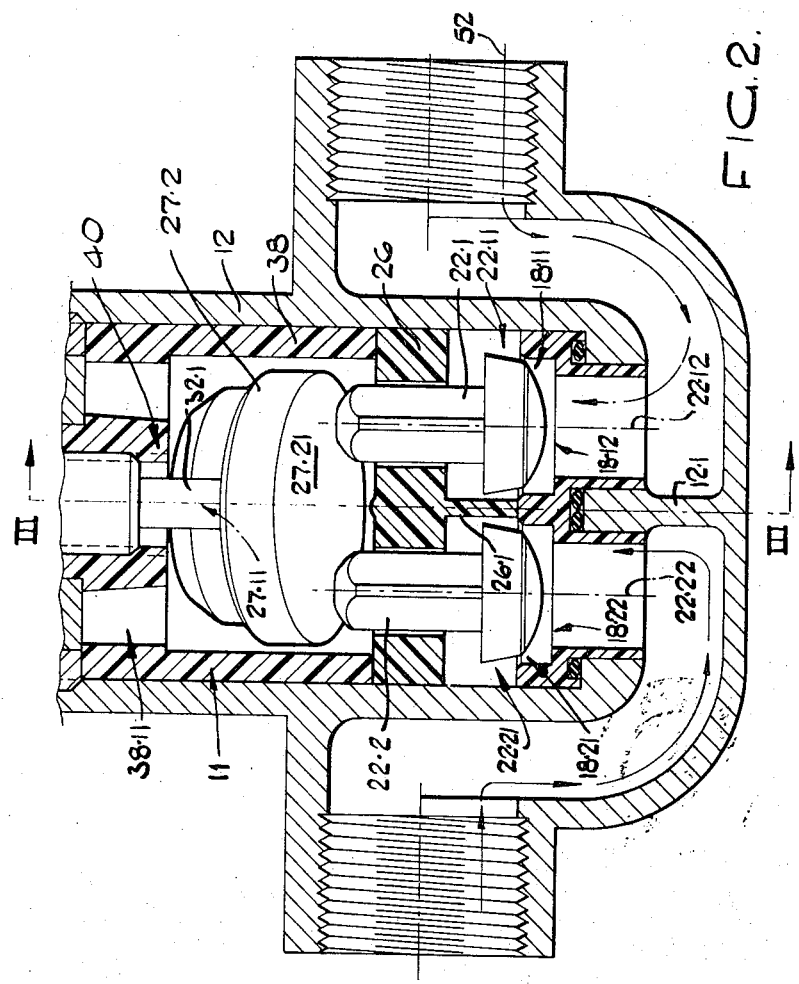
FIG. 2 shows a part-axial section similar to that of FIG. 1, but with the tilt member of the adjustment member in a tilted position.
Figure 3:
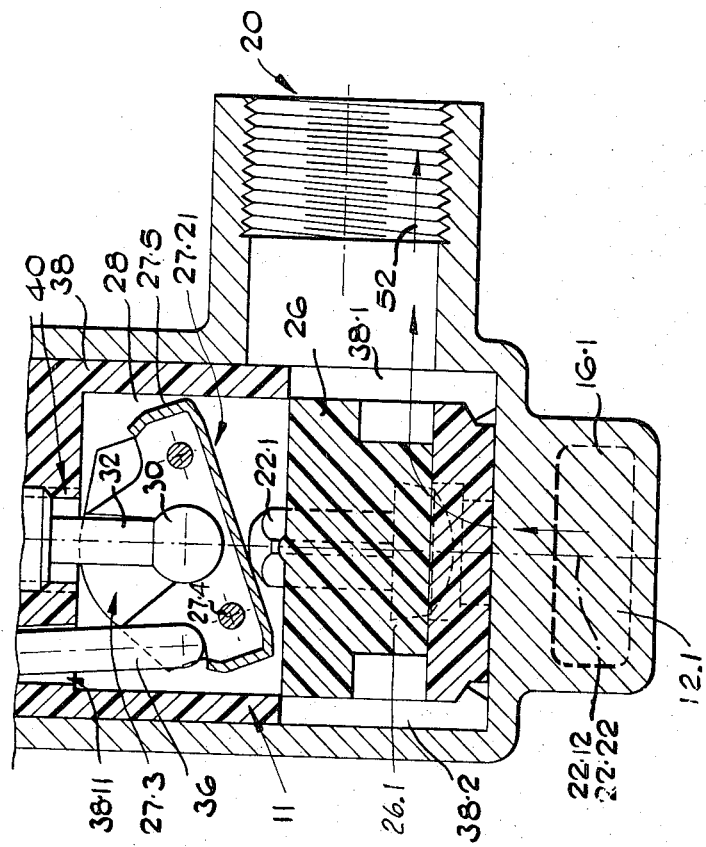
FIG. 3 shows a part-axial section taken at III—III in FIG. 2.

Referring now to FIGS. 2 and 3 of the drawings, the said surface 27.21 is indicated after the adjustment member 27 has been rotated by the fulcrum pin 36 an amount of 90° relative to that shown in FIG. 1. It will be noticed that now the closure members 22.1 and 22.2 are capable of equal axial displacements relative to their seats 18.1 and 18.2.

Arcuate displacement of the tilt member 27.2 about the axis 27.11 is obtainable by rotation of the knob 42 about the said axis 27.11 within the valve body 12. Such rotation causes the fulcrum pin 36 to be moved in an arc about the axis 27.11, thereby arcuately to displace the tilt member 27.2. The member 38 is provided with an arcuate slot 38.11 to permit arcuate movement of the fulcrum pin 36. For full adjustability, the fulcrum pin is displaceable in slot 38.11 over an arc of 180° about the axis 27.11.

The spindle stem 32 is guided to have little lateral clearance within a slot 27.3 in the tilt member 27.2. The tilt member 27.2 comprises two halves held together by fastening means in the form of pins 27.4. The halves may be moulded from a synthetic plastic material and may be provided with a metal cap 27.5 which provides the cam-like surface 27.21 which is flat, and which holds the two halves together.

A baffle 26.1 is provided so as to promote flow through the valve seats 18.1 and 18.2 towards the outlet opening 20.

The valve closure members 22.1 and 22.2 are provided with frusto-conical formations 22.11 and 22.21. The degree of taper is such that the cross-sectional area available for flow at 18.11 is substantially the same as at 18.12 when the closure member is displaced off its seat. Likewise, the degree of taper for the valve closure member 22.2 is such that the cross-sectional area available for fluid flow at 18.21 is substantially the same as that at 18.22.

The guide member 26 and the closure members 22.1 and 22.2 together form a sub-assembly which is held by resilient longitudinal arms 38.1 and 38.2 of the member 38. The sub-assembly is provided with O-rings 41 to ensure sealing engagement between the sub-assembly and the valve body 12. The member 38 and the sub-assembly are located in position by the skirts which define the seats 18.1 and 18.2, engaging with openings in the valve body 12. This sub-assembly and the members 27 and 38 together constitute a valve mechanism which is bodily removable from the valve body 12.

The member 38 is provided with male formations 38.3 engaging with a washer 44 to locate the knob 42 axially in position. The washer 44 is urged into engagement with the male formations 38.3 by means of the spring 46. The washer 44 also serves to keep the O-rings 48 in their cavity about the spindle 27.1.

The spindle 27.1 is sealed by means of O-rings 48. The knob 34 engages via splined formations 34.1 with the spindle 27.1. The knob 42 engages via splined formations 42.1 with the fulcrum member 36.2 which is rotatably mounted within end ring 50 and around the stem portion of the member 38. O-rings 50.1 and 50.2 ensure sealing engagement between the stem portion of the member 38, the fulcrum member 36.2 and the annular end ring 50. An O-ring 50.3 ensures sealing engagement between the annular end ring 50 and the valve body 12.

In use, assume that inlet opening 14.1 is connected to a cold water supply, and inlet opening 14.2 to a hot water supply. In FIG. 1 the valve is shown in its closed position. In order to open the valve, the knob 34 is screwed outwardly. This causes the tilt member 27.2 to tilt about the end of the fulcrum pin 36. The tilt member lies for example in the position shown dotted 27.22. In that position, the closure member 22.1 will be displaceable off its seat as shown dotted in FIG. 1. In other words, cold water will then be able to flow from the opening 14.1 out of the opening 20. (See arrows 52 in FIGS. 2 and 3). In the position shown in FIG. 1, the tilt member 27.2 will still bear on the closure member 22.2, thereby maintaining it on its seat 18.2. By turning the knob 42 an amount of, say, 90° in the clockwise direction about the axis 27.11, when viewed from the handle end, the fulcrum pin 36 will be displaced arcuately in the slot 38.11 and will bring the tilt member 27.2 into the position shown in FIGS. 2 and 3 of the drawings. In this position, both closure members 22.1 and 22.2 will be displaceable off their seats. The degree of displaceability of the closure member 22.1 will, however, have been reduced compared with that shown dotted in FIG. 1.

It will be realized that by suitably adjusting the arcuate position of the adjustment member 27 and specifically the tilt member 27.2 about its axis, it will be possible to obtain a stepless adjustment of the proportions of flow through the seats 18.1 and 18.2. The degree of displacement of the closure members 22.1 and 22.2 off their seats may be adjustable by means of axial positioning of the spindle 27.1 along the axis 27.11. This also provides stepless adjustment in the degree of opening of the valves.

Figure 4:
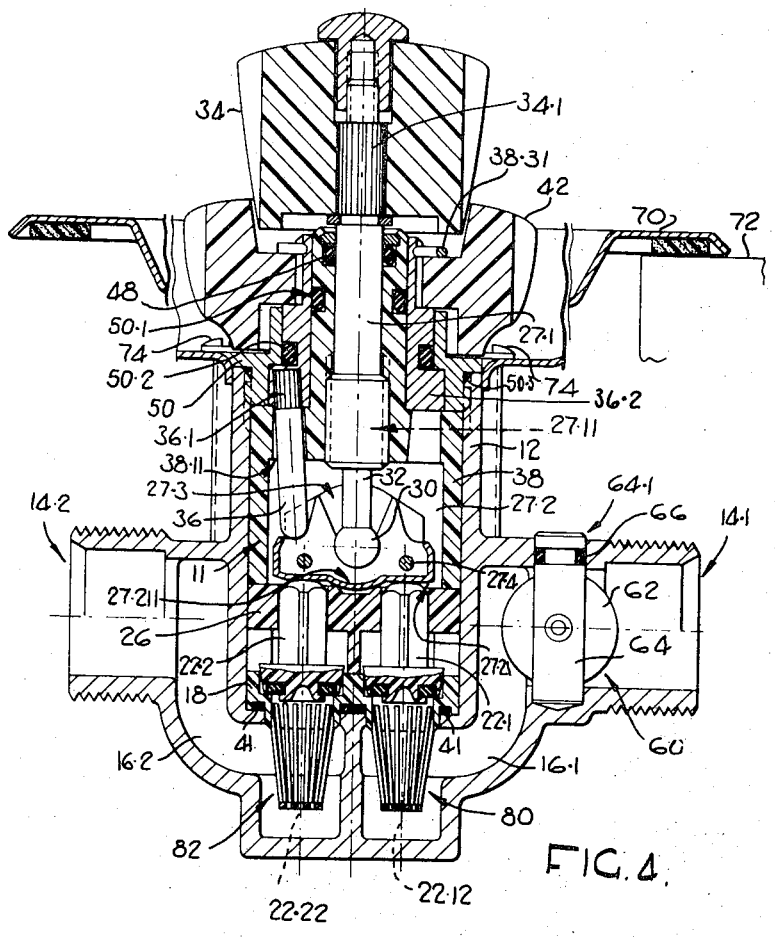
FIG. 4 shows an axial section similar to that shown in FIG. 1, of another embodiment of a mixer valve in accordance with the invention.

Referring now to FIG. 4 of the drawings, there is shown another embodiment of a mixer valve. It is bascially of the same construction but has in addition an ajustable gate in the form of a butterfly valve 60. It comprises a disc 62 on a spindle 64 pivotally mounted in the cold water inlet passage 16.1. The spindle is sealed by an O-ring 66 where the spindle passes out of the housing. The end 64.1 of the spindle 64 is slotted to take a screw-driver whereby the degree of opening of the gate is adjustable.

In use, the butterfly is set on installation to permit cold water to flow when the valve is fully open at about the same rate as the hot water. Once set on installation, the butterfly is intended to remain at that setting unless the supply pressure for cold water changes substantially.

FIG. 4 shows some further mirror constructional changes. Thus FIG. 4 shows a cover plate 70 to cover up the cavity in the wall 72. It also shows screws 74 holding the cover plate 70 and the valve body 12. Otherwise some seals have been changed. The fulcrum pin 36 has a knurled end 36.1 embedded in the member 36.2. The cam-like surface 27.21 is no longer altogether flat but is in the form of a flat surface ring around a raised dimple 27.211. Furthermore, cages 80 and 82 are provided on the inlet sides of the seats 18.1 and 18.2 respectively. These cages are intended to prevent large solids fouling the seats. The method of securing the knobs has also been changed. The knob 42 is retained by a circlip 38.31 instead of by male formations 38.3.

The valve body 12 may conveniently be a metal casting. The various parts constituting the valve mechanism, except for the spindle 27.1, O-rings, and fulcrum pin 36, may be mouldings of synthetic plastic material.

It is an advantage of this invention that the relative openings of the closure members 22.1 and 22.2 can be rapidly and quickly set by merely turning a knob. The amount of full flow can also be rapidly set, also by merely turning a knob. This is particularly useful for hot water for a bath or shower. The invention also has the advantage that the gate means ensures that cold water inlet flow can be throttled to be more or less the same as the maximum rate of flow of the hot water. The setting of the gate means takes place on installation.

What I claim is:

1. A valve sub-assembly which is removably replaceable as a unit in a valve body and which is adapted to seat sealingly in the valve body, the sub-assembly including a plurality of valve closure members axially displaceable in operation relative to their seats, and an adjustment member having a cam-like adjustment surface for co-operating cam-follower fashion with the valve closure members, the adjustment member being axially displaceable relative to an adjustment axis offset from the axes of the closure members and including a tilt member and a spindle which is co-axial with the adjustment axis and which provides the axial displaceability of the adjustment member along the adjustment axis, the tilt member being pivotally mounted ball and socket fashion on the spindle so as to be arcuately displaceable about the adjustment axis and tiltable relative to the spindle about an axis disposed transversely to the adjustment axis and having the cam-like surface which is thereby also tiltable in abutting relationship with the valve closure members.

2. A valve sub-assembly as claimed in claim 1, in which the adjustment member is rotatable by means of a handle-like member coaxial with the spindle which is also rotatable by a handle like member.

3. A valve subassembly as claimed in claim 1, in which there is provided a fulcrum support offset from the adjustment axis and adapted to abut against the tilt member when the spindle is axially displaced along the adjustment axis, thereby providing tilting of the tilt member and hence of the said adjustment surface relative to the spindle.

* * * * *